(12) United States Patent
McDonagh et al.

(10) Patent No.: US 12,143,730 B2
(45) Date of Patent: Nov. 12, 2024

(54) META-LEARNING FOR CAMERA ADAPTIVE COLOR CONSTANCY

(71) Applicant: Huawei Technologies Co., Ltd., Shenzhen (CN)

(72) Inventors: Steven George McDonagh, Munich (DE); Sarah Parisot, Munich (DE); Gregory Slabaugh, London (GB); Zhenguo Li, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 948 days.

(21) Appl. No.: 17/031,423

(22) Filed: Sep. 24, 2020

(65) Prior Publication Data
US 2021/0006760 A1 Jan. 7, 2021

Related U.S. Application Data

(63) Continuation of application No. PCT/EP2018/081560, filed on Nov. 16, 2018.

(51) Int. Cl.
*H04N 23/88* (2023.01)
*G06T 7/90* (2017.01)
(Continued)

(52) U.S. Cl.
CPC .............. *H04N 23/88* (2023.01); *G06T 7/90* (2017.01); *G06N 3/0985* (2023.01); *G06T 2207/10024* (2013.01); *G06T 2207/20081* (2013.01)

(58) Field of Classification Search
CPC ..... H04N 23/88; H04N 1/6086; G06N 3/0985
(Continued)

(56) References Cited

U.S. PATENT DOCUMENTS

| 9,336,582 B1 | 5/2016 | Barron |
| 2018/0091773 A1* | 3/2018 | Moussa ................... G06T 1/20 |

(Continued)

FOREIGN PATENT DOCUMENTS

| CN | 106412547 A | 2/2017 |
| CN | 107578390 A | 1/2018 |

OTHER PUBLICATIONS

Finn et al.—See item 6 under NPL documents on the IDS filed Nov. 12, 2020 for the citation. (Year: 2017).*

(Continued)

*Primary Examiner* — Anthony J Daniels
(74) *Attorney, Agent, or Firm* — Leydig, Voit & Mayer, Ltd.

(57) ABSTRACT

A processing entity generates a model for estimating scene illumination colour for a source image captured by a camera. The processing entity acquires a set of images, captured by a respective camera, the set of images as a whole including images captured by multiple cameras; forms a set of tasks by assigning each image of the images set to a respective task such that images in the same task have in common that a the images are in a predetermined range; trains model parameters by repeatedly: selecting at least one of the tasks, forming an interim set of model parameters based on a first subset of the images of that task, estimating the quality of the interim set of model parameters against a second subset of the images of that task and updating the parameters of the model based on the interim set of parameters and the estimated quality.

15 Claims, 6 Drawing Sheets

(51) Int. Cl.
 *H04N 1/60* (2006.01)
 *G06N 3/0985* (2023.01)
(58) Field of Classification Search
 USPC .................................................... 348/223.1
 See application file for complete search history.

(56) References Cited

U.S. PATENT DOCUMENTS

| 2019/0045163 | A1* | 2/2019 | Nikkanen | H04N 23/88 |
| 2019/0311464 | A1* | 10/2019 | Chuang | G06T 7/90 |
| 2020/0034694 | A1* | 1/2020 | Lacoste | G06F 18/24155 |

OTHER PUBLICATIONS

Aytekin et al., "A Dataset for Camera Independent Color Constancy," 2017, IEEE (https://ieeexplore.ieee.org/ielaam/83/8103362/8070991-aam.pdf?tag=1) (Year: 2017).*

Xiao et al., "Multi-Domain Learning for Accurate and Few-Shot Color Constancy," 2020, Computer Vision Foundation, 3258-3267 (Year: 2020).*

Oh et al., "Approaching the Computational Color Constancy as a Classification Problem through Deep Learning," Preprint Submitted to Pattern Recognition, arxiv.org, Cornell University Library, pp. 1-13, XP080722405 (Aug. 2016).

Banic et al., "Unsupervised Learning for Color Constancy," Proceedings of the 13th International Joint Conference on Computer Vision, Imaging and Computer Graphics Theory and Applications (VISIGRAPP 2018)—vol. 4: VISAPP, pp. 181-188, XP055603618 (Jan. 2018).

Aytekin et al., "INTEL-TUT Dataset for Camera Invariant Color Constancy Research," arxiv.org, Cornell University Library, pp. 1-13, XP081274914 (Mar. 2017).

Gao et al., "Improving Color Constancy by Discounting the Variation of Camera Spectral Sensitivity," arxiv.org, Cornell University Library, pp. 1-13, XP081361439 (Nov. 2016).

McDonagh et al., "Meta-Learning for Few-shot Camera-Adaptive Color Constancy," arxiv.org, Cornell University Library, Total 14 pages, XP080940159 (Nov. 2018).

Finn et al., "Model-Agnostic Meta-Learning for Fast Adaptation of Deep Networks," Proceedings of the 34th International Conference on Machine Learning, Sydney, Australia, PMLR 70, Total 13 pages, Retrieved from the Internet: URL:https://arxiv.org/pdf/1703.03400.pdf, XP055484442 (Jul. 2017).

"IEEE Standard for Information technology—Telecommunications and information exchange between systems Local and metropolitan area networks—Specific requirements—Part 11: Wireless LAN Medium Access Control (MAC) and Physical Layer (PHY) Specifications," in IEEE Std 802.11-2016 (Revision of IEEE Std 802.11-2012), pp. 1-3534, Institute of Electrical and Electronics Engineers, New York, New York (Dec. 2016).

Bianco et al., "Color Constancy Using CNNs," 2015 IEEE Conference on Computer Vision and Pattern Recognition Workshops (CVPRW), arXiv:1504.04548v1 [cs.CV], Total 9 pages, Institute of Electrical and Electronics Engineers, New York, New York (Apr. 2015).

* cited by examiner

Algorithm 1 MAML for Few-Shot AWB Regression

Require: $p(\mathcal{T})$ : distribution over tasks
Require: $\alpha, \beta$ : step size hyperparameters 1: randomly init $\theta$
2: while not done do
3:    Sample batch of tasks $\mathcal{T}_i \sim p(\mathcal{T})$
4:    for all $\mathcal{T}_i$ do
5:        Sample $K$ datapoints $\mathcal{D} = \{x^{(j)}, y^{(j)}\}$ from $\mathcal{T}_i$
6:        Evaluate $\nabla_\theta \mathcal{L}_{\mathcal{T}_i}(f_\theta) = \nabla_\theta \sum_{x^{(j)}, y^{(j)} \sim \mathcal{T}_i} \|f_\theta(x^{(j)}) - y^{(j)}\|_2^2$
7:        Compute adapted parameters with gradient descent: $\theta'_i = \theta - \alpha \nabla_\theta \mathcal{L}_{\mathcal{T}_i}(f_\theta)$
8:        Sample datapoints $\mathcal{D}'_i = \{x^{(j)}, y^{(j)}\}$ from $\mathcal{T}_i$ for the meta-update
9:    end for
10:   Update $\theta \leftarrow$ using each $\mathcal{D}'_i$ and $\mathcal{L}_{\mathcal{T}_i}$
11: end while

Figure 4

401 — Acquire a set of images, each image having been captured by a respective camera, the set of images as a whole comprising images captured by multiple cameras 402 — Form a set of tasks by assigning each image of the set of images to a respective task such that images in the same task have in common that a property of those images lies in a predetermined range 403 — Train parameters of the model by repeatedly: selecting at least one of the tasks, forming an interim set of model parameters in dependence on a first subset of the images of that task, estimating the quality of the interim set of model parameters against a second subset of the images of that task and updating the parameters of the model in dependence on the interim set of parameters and the estimated quality

META-LEARNING FOR CAMERA ADAPTIVE COLOR CONSTANCY

CROSS-REFERENCE TO RELATED APPLICATIONS

This application is a continuation of International Application No. PCT/EP2018/081560, filed on Nov. 16, 2018, the disclosure of which is hereby incorporated by reference in its entirety.

FIELD

The present disclosure relates to accurately estimating scene illumination colour for the purpose of performing Auto White Balancing (AWB) for digital images.

BACKGROUND

An essential component of digital image pre-processing involves accounting for the effect of scene illumination, enabling natural image appearance. Estimating and correcting scene illuminant colour is commonly referred to as "colour constancy" (CC), or Auto White Balancing, and is an algorithmic component of an Image Signal Processing (ISP) pipeline in digital photography. The process of computational CC can be defined as the transformation of a source image, captured under an unknown illuminant, to a target image representing the same scene under a canonical illuminant (white light source). The ability to provide accurate recording of intrinsic scene colour information is also of extreme importance for many practical applications including colour-based object recognition, fine-grained classification, semantic segmentation and machine vision quality control. Such applications commonly require that input images are device independent and colour-unbiased, however captured image colours are always affected by the prevailing light source colour incident in a scene. These practical requirements for the extraction of intrinsic colour information from scene surfaces highlight the importance of an ability to compensate for scene illuminant colour.

CC algorithms typically consist of two stages to obtain the target image: firstly, estimation of the scene illuminant colour; and secondly, transformation of the source image, accounting for the illuminant, such that the resulting image illumination appears achromatic. The first stage presents the challenging task as it is inherently an underconstrained problem and can be considered ill-posed. The colour of a surface is determined by both surface reflectance properties and by the spectral power distribution of the light(s) illuminating it. Variations in scene illumination, therefore, change the colour of surface appearance in an image. This combination of properties makes the problem underdetermined. Explicitly, the three physical factors, consisting of intrinsic surface reflectance, illuminant light colour, and also camera spectral sensitivity (CSS), are collectively unknown and need to be estimated. However, in practice we only observe a product of these factors, as measured in the digital image.

More specifically, a trichromatic photosensor response is modelled in the standard way such that:

$$\beta_k(X) = \int_\Omega E(\lambda) S(\lambda, X) R_k(\lambda) d\lambda, k \in \{R, G, B\} \quad (1)$$

where $\rho_k(X)$ is the intensity of colour channel k at pixel location X, $\lambda$ is the wavelength of light such that: $E(\lambda)$ represents the spectrum of the illuminant, $S(\lambda, X)$ the surface reflectance at pixel location X and $R_k(\lambda)$ the CSS for channel k, considered over the spectrum of visible wavelengths $\Omega$. The goal of computational CC then becomes estimation of the global illumination colour $\rho_k^E$ where:

$$\rho_k^E = \int_\Omega E(\Delta) R_k(\Delta) d\lambda, k \in \{R, G, B\} \quad (2)$$

Finding $\rho_k^E$ for each k in Equation (2) is ill-posed due to the many combinations of illuminant colour and surface reflectance that result in the same image value.

Work on single image illuminant colour estimation can broadly be divided into statistics-based and learning-based methods. Classical methods utilise low-level statistics to realise various instances of the gray-world assumption: the average reflectance in a scene under a neutral light source is achromatic. Gray-world and extensions thereof are based on these assumptions that tie scene reflectance statistics (e.g. mean, maximum reflectance) to the achromaticity of scene colour. Related assumptions define perfect reflectance and result in White-Patch methods.

Digital camera pipelines typically employ statistical colour constancy methods to estimate an unknown scene illuminant. Statistical methods are fast and typically contain few free parameters. However, performance is highly dependent on strong scene content assumptions, and can dramatically decrease in cases where assumptions fail to hold.

Previous work has made use of traditional machine learning methods relying on hand crafted image features. Recent advances in the state-of-the-art of learning-from-data approaches have resulted in improved accuracy for the AWB task. Learning-based methods include combinational and direct approaches. The former applies optimal combinations of statistical methods to the input image, based on the observed scene. However, the result quality depends on the considered unitary methods, whose output they combine. Contemporary learning-based approaches, which learn optimal image features and further directly learn a mapping from image information to the scene illuminant colour, can currently be considered the state-of-the-art in terms of estimation accuracy.

In the context of neural networks, a model is a neural network architecture, and its associated weights, which are used to estimate the scene illumination given an image. The weights are learned during a training procedure using images and their associated ground truth scene illumination. Notable recent deep-learning based colour constancy approaches are supervised in nature and typically require large amounts of calibrated and hand-labelled sensor-specific annotated datasets of imagery to learn robust models for each target device.

If large amounts of labelled and calibrated sensor data are available, traditional learning-based methods have been shown to provide state-of-the-art estimation accuracy. However, collection and calibration of imagery for supervised training approaches to the colour constancy problem can be considered expensive and restrictive, commonly requiring placement of a physical calibration object in the scene where images are to be captured and, subsequently, to accurately segment the object in image space in order to extract ground-truth (GT) illuminant information. The supervised learning requirements for manual image labelling also make data collection for new sensors both time consuming and expensive.

In one known approach, as described in "Color constancy using CNNs," S Bianco, C Cusano, R Schettini, CVPR Workshop (2015), a Convolutional Neural Network (CNN) is used to predict the scene illumination. Taking image patches as input, the CNN works in the spatial domain without using hand-crafted features. The network consists of one convolutional layer with max pooling, one fully connected layer and three output nodes. Within the network structure, feature learning and regression are integrated into one optimization process. Experiments on images with spatially varying illumination demonstrate the stability of the local illuminant estimation ability of the CNN.

In another approach, as described in "Unsupervised Learning for Color Constancy," Nikola Banic and Sven Loncaric, arXiv (2018), an unsupervised learning-based method is proposed that learns its parameter values after approximating the unknown ground-truth illumination of the training images. In this way, the method avoids using calibrated images with known ground truth illumination.

CN 106412547 A and CN 107578390 A also describe methods using neural networks to correct the white balance of images.

SUMMARY

According to a first aspect of the present disclosure, there is provided a processing entity configured to generate a model for estimating scene illumination colour for a source image captured by a camera, by the steps of: acquiring a set of images, each image having been captured by a respective camera, the set of images as a whole comprising images captured by multiple cameras; forming a set of tasks by assigning each image of the set of images to a respective task such that images in the same task have in common that a property of those images lies in a predetermined range; training parameters of the model by repeatedly: selecting at least one of the tasks, forming an interim set of model parameters in dependence on a first subset of the images of that task, estimating the quality of the interim set of model parameters against a second subset of the images of that task and updating the parameters of the model in dependence on the interim set of parameters and the estimated quality. This may allow scene illuminants to be inferred accurately for image sensors without access to large training data by enabling the generation of models capable of fast task-adaption.

The predetermined range may be defined such that the predetermined range corresponds to a set of colour temperatures of the image and/or the camera that by which the image was captured. The images of each task may have in common that they are captured by a single camera. The complete range of colour temperatures that an image may have (which may be, for example, 0-12000 K) may be partitioned into a discrete set of bins. Each image may then be assigned a bin based on its colour temperature.

The images captured by each camera may be allocated to different bins if their colour temperatures are substantially different. Split points may be defined for the desired number of bins and the images are assigned to their respective bins if their colour temperature falls within the ranges defined by the split points. This is a convenient way of allocating images to colour temperature bins. Determining the colour temperature of images and allocating the images to tasks based on their colour temperature is a convenient way of allocating images to tasks. Associating each camera task with a set of subtasks in which the RGB illuminant corrections are clustered may help to achieve good performance.

The colour temperature may be a correlated colour temperature (CCT). CCT is the point on the Plankian locus closest to the non-Planckian light source and reflects the colour temperature of the image. This provides a convenient way of determining the colour temperature of an image.

Each respective camera may be a camera type. Tasks may be formed such that different tasks correspond to different camera types. For example, each camera may be a model of camera produced by a particular manufacturer. Device-specific CSS affects the colour domain of captured images and the recording of scene illumination. Allocating to tasks based on camera type may help to ensure that the generated model is robust to CSS.

The step of training may be performed using few-shot learning. The step of training may be performed by a Meta-Learning algorithm. An example of such an algorithm is a Model Agnostic Meta-Learning (MAML) algorithm. The MAML algorithm allows good initialisation parameters to be determined after a few steps of standard training on a few-shot dataset.

The cameras may exhibit substantially varying spectral sensitivity, and/or the images may exhibit substantially diverse scene content. In the present disclosure, multiple datasets are used to train a model that is robust to CSS. The few-shot meta-learning technique can be applied to many related, yet distinct, illuminant estimation tasks comprising images from multiple camera sources, exhibiting varying spectral sensitivity and diverse scene content. Using only handfuls of target-device labelled data, the model may learn to adapt quickly to new sensors and infer accurate scene illuminants.

The images may comprise data indicating the camera that they were taken with. This may allow the images to be efficiently allocated to their respective tasks.

The processing entity may be further configured to train the algorithm for a further camera by: acquiring a set of images, each image having been captured by the further camera; forming a set of tasks by assigning each image of the set of images to a respective task such that images in the same task have in common that a property of those images lies in a predetermined range; and training parameters of the model on those tasks. This may allow the model to learn to quickly adapt and generalize to new sensors and infer accurate scene illuminants for images observed by previously unseen cameras.

The set of acquired images may form a few-shot set. This may result in a model that exhibits strong performance using only handfuls of target-device labelled data, compared to hundreds or thousands of samples in previous techniques.

According to a second aspect of the present disclosure, there is provided a method of generating a model for estimating scene illumination colour for a source image captured by a camera, the method comprising: acquiring a set of images, each image having been captured by a respective camera, the set of images as a whole comprising images captured by multiple cameras; forming a set of tasks by assigning each image of the set of images to a respective task such that images in the same task have in common that a property of those images lies in a predetermined range; training parameters of the model by repeatedly: selecting at least one of the tasks, forming an interim set of model parameters in dependence on a first subset of the images of that task, estimating the quality of the interim set of model parameters against a second subset of the images of that task and updating the parameters of the model in dependence on the interim set of parameters and the estimated quality. This may allow scene illuminants to be inferred accurately for image sensors without access to large training data by enabling the generation of models capable of fast task-adaption.

The method may further comprise determining illuminant colour for an image collected by a camera not in the set of cameras by means of the model. The method requires only few labelled samples and intrinsically learns an ability to generalize to new, previously unseen cameras. As a result, the AWB algorithm produces both measurably and perceptually high quality image illuminant estimation and is capable of generalizing to new image sensors with only few data samples. This allows scene illuminants to be inferred accurately for image sensors without access to large training data and allows for the generation of models capable of fast task-adaption, allowing illuminant inference for new camera sensors using very few training images (typically 1+ orders of magnitude fewer than typical imagery for this task).

The method may further comprise transforming the image in dependence on the determined illuminant colour. The transformed image may represent the scene of the source image under a canonical illuminant. This corrects for scene illumination, enabling natural image appearance in the target image.

According to a third aspect of the present disclosure, there is provided a camera comprising a processor configured to determine illuminant colour for a source image collected by the camera by means of a model generated by the method described herein.

BRIEF DESCRIPTION OF THE FIGURES

The present disclosure will now be described by way of example with reference to the accompanying drawings. In the drawings.

Figure 2:
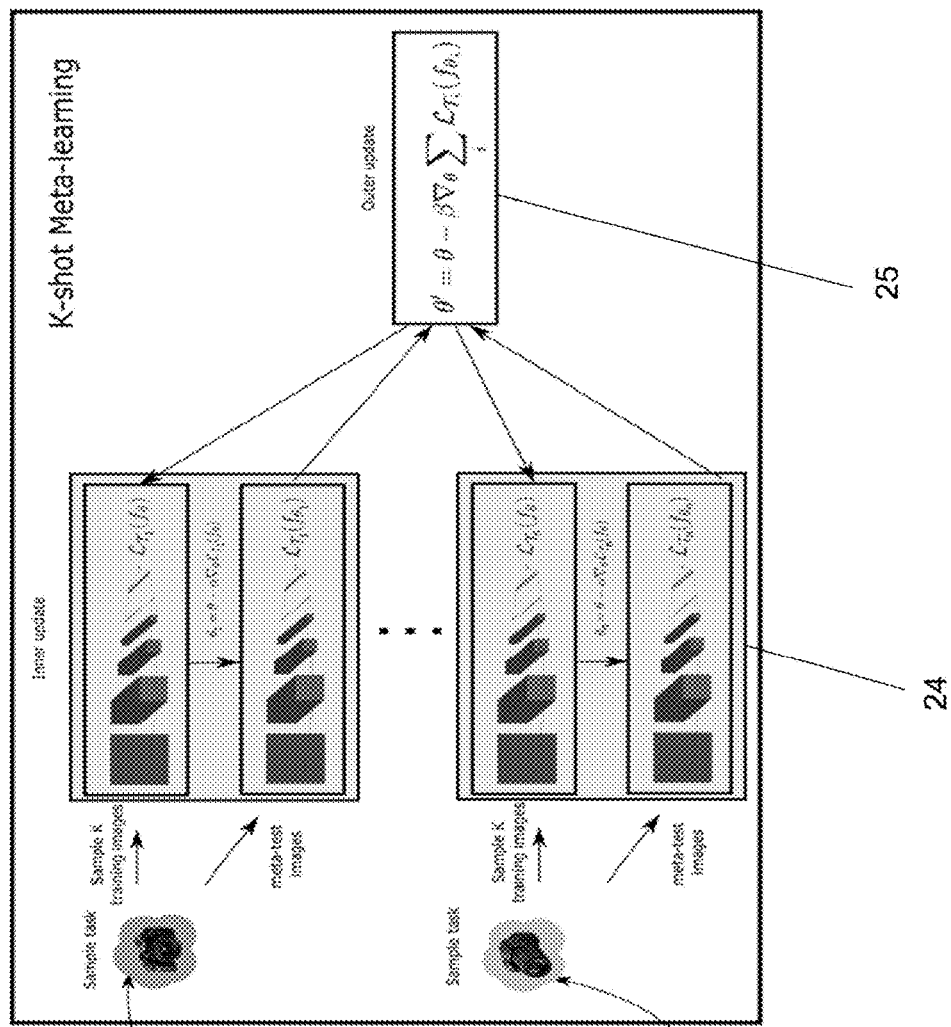
Figure 2:
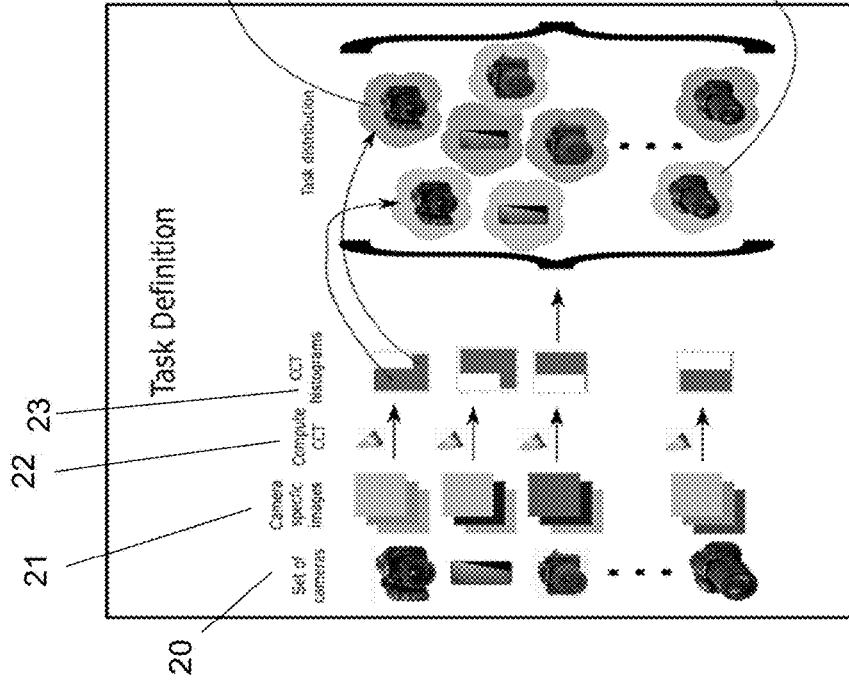
Figure 5:
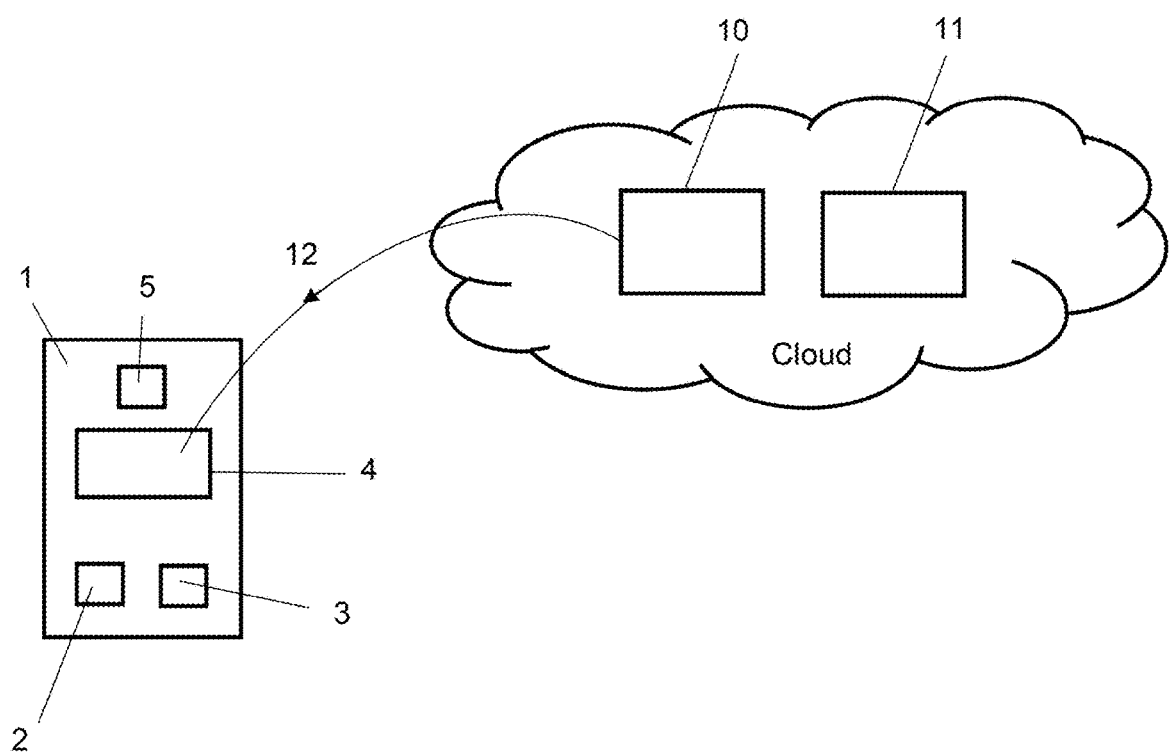
Figure 6:
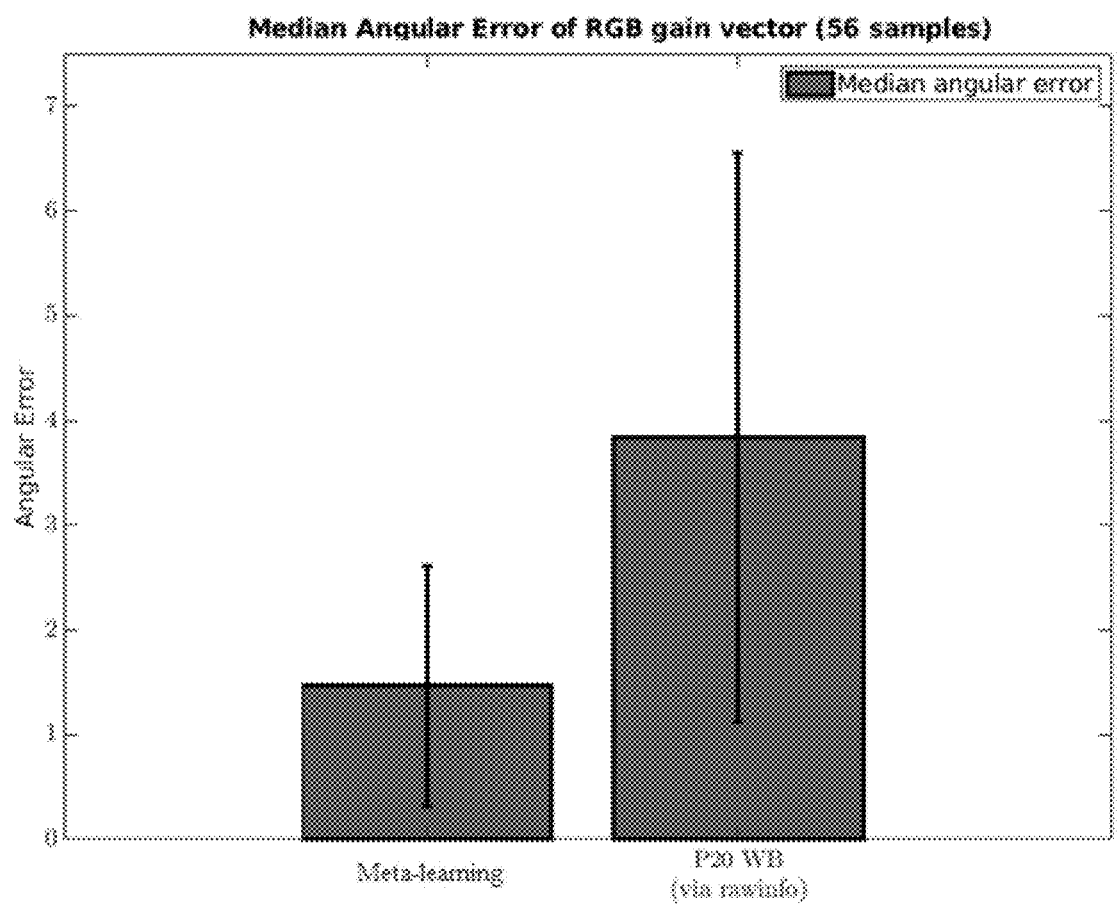

space, showing correlation between perceptually meaningful image temperatures (hot, cold) and separable ground-truth gain clusters in RGB space;

FIG. 1(b) shows GT datapoints, pertaining to identical scenes with similar illuminant, captured with two cameras;

FIG. 2(a) shows an overview of the proposed strategy defining the task distribution;

FIG. 2(b) illustrates a process for K-shot meta-learning;

FIG. 3 shows an example of a Meta-Learning algorithm used to perform AWB according to the present disclosure;

FIG. 4 shows an example of a method of generating a model for estimating scene illumination colour for a source image captured by a camera according to the present disclosure;

FIG. 5 shows an example of an architecture including a camera configured to perform AWB according to the present disclosure; and FIG. 6 shows angular-error results showing the benefit of performing the Auto White Balancing task using the Meta-learning approach compared to the existing approach used on the AWB estimation from the P20 Pro smartphone.

DETAILED DESCRIPTION

The present disclosure relates to a meta-learning approach to fully-supervised convolutional regression for Auto White Balancing (AWB).

The inventors have recognized that combination of assiduous image acquisition, large amount of manual work, and accurate yet data-hungry deep-learning approaches are barriers preventing fast, efficient and cheap supervised training of models capable of providing highly accurate and robust illuminant estimation to new target device sensors.

The inventors have also recognized that high production rate of new sensor hardware devices motivates the need for techniques capable of delivering accurate AWB performance, typical of deep learning components, yet possessing only frugal image data requirements.

An AWB learning task consists of learning to correctly infer scene illuminant colour(s) from a given image. Meta-learning the AWB task can be implemented in a variety of ways. In its most minimal form, a meta-learning AWB approach has at least three components:
1. Meta-learning framework: enables the ability to successfully generalize across similar yet distinct tasks.
2. Task definition: allows the instantiation of individual learning-tasks. These samples define an appropriate task distribution.
3. Learning architecture: regression model capable of learning to infer scene illuminant from imagery. In one example, this comprises a convolutional neural network performing illuminant regression to {r,g,b} triples from image data.

One method of implementing the AWB task will now be described.

Consider an RGB image I that has been captured with camera C under a light source of unknown colour. The objective is to estimate a global illuminant correction vector $\rho=[r, g, b]$ such that the corrected image I* appears identical to a canonical image (i.e. an image captured under a white light source). While a scene may contain multiple illuminants, the standard simplifying assumption is followed and a single global illuminant correction is determined per image.

The illuminant estimation is cast as a regression task $\widehat{\rho_\theta} = f_\theta(I)$, where $f_\theta$ is a nonlinear function described by a neural network model. The model's parameters $\theta$ are learned and optimised by minimising the well-known angular error loss:

$$L(\hat{\theta}) = \arccos\left(\frac{\widehat{\rho_\theta}}{\|\widehat{\rho_\theta}\|} \cdot \frac{\rho}{\|\rho\|}\right) \quad (3)$$

Angular error provides a standard metric sensitive to the inferred orientation of the $\widehat{\rho_\theta}$ vector yet agnostic to its magnitude, providing independence to the brightness of the illuminant, while comparing its colour. A simple architecture is adopted comprising of four convolutional layers (all sized 3×3×64) and two fully connected layers (sizes 64×64, 64×3) all with rectified linear unit activations, except for the last layer.

Given a dataset comprising images acquired using a single camera C under varying illumination conditions, one can learn to regress global illuminants. While there are many publicly available datasets, most comprise a relatively small number of images and are camera-specific. This limits the performance of deep learning techniques and typically necessitates aggressive data augmentation and/or pre-training on only quasi-related tasks.

In addition, device-specific Camera Spectral Sensitivities (CSS) affect the colour domain of captured images and the recording of scene illumination. Images captured by different cameras can therefore exhibit ground-truth illuminant distributions that occupy differing regions of the chromaticity space. This means that two images of the same scene and illuminant will have different illuminant corrections if taken by different cameras. As a result, model performance can be limited when training/testing on images acquired from multiple cameras.

In the present disclosure, multiple datasets are used to train a model that is robust to CSS. Images from different cameras are used to derive the tasks, which are used in the optimisation phase of the model training. The objective is to partition all available images into a set of tasks such that a) tasks are distinct and diverse, yet numerous enough to learn a good model initialisation, and b) a task contains samples with a level of homogeneity that yields good performance when fine-tuning the model using only a few training images.

Images are assigned to the same task if they have at least one property that lies in a predetermined range (i.e. the images in one task have similar properties). A property of the image, in one example, may be the colour temperature (CT) of the image. CT is a common measurement in photography, often used in high-end cameras to describe the colour of the illuminant for setting white balance. By definition, CT measures, in degrees Kelvin, the temperature that is required to heat a Planckian (or black body) radiator to produce light of a particular colour. A Planckian radiator is defined as a theoretical object that is a perfect radiator of visible light. The Planckian locus is the path that the colour of a black body radiator would take in chromaticity space as the temperature increases, effectively illustrates all possible colour temperatures. In practice, the chromaticity of most light sources is off the Planckian locus, so the Correlated Colour Temperature (CCT) is computed. CCT is the point on the Planckian locus closest to the non-Planckian light source. Intuitively, CCT is a description of the colour of the light source and can be approximated from photos taken under this light. Different temperatures can be associated with different types of light. The complete range of colour temperatures that an image in the set of images to be assigned to tasks may have (which may be, for example, 0-12000 K) may be partitioned into a discrete set of bins. Each image may then be assigned a bin based on its colour temperature.

Another property of the image may be the type of camera that took the image. For example, the camera may be a particular model of camera produced by a particular manufacturer. As described above, device-specific CSS affects the colour domain of captured images and the recording of scene illumination. In this case, the images can be binned into respective tasks with each bin corresponding to images taken using different cameras.

Other image properties may also be used to assign the images to respective tasks. For example, semantic properties such as the object classes present (or absent) in the image. As an example, one task bin might contain all images of dogs, and another bin might contain all images of cats.

Another semantic property that may be used to assign the images to tasks is scene type. Images can be labelled with their content, for example indoors, outdoors, day, night, beach, forest or sky. These scene types could again define the bin separation for the tasks.

The property may also be a continuous property. For example, low-level vision, signal processing continuous value properties such as image noise level and image ISO level.

In one possible approach for generating the task distribution, the camera type is defined as a task, as described above. This would normally require a substantial amount of camera specific data to provide enough task diversity for training. In addition, it would be expected to observe large variability in illuminant correction within one camera dataset, due to both scenes and light source diversity. Achieving good performance on tasks containing too much diversity is difficult, especially when each camera specific model will be fine-tuned in a few-shot setting. Therefore, in a preferred example, each camera task may also be associated with a set of subtasks in which the RGB illuminant corrections are clustered. Gamut based colour constancy methods assume that the colour of the illuminant is constrained by the colours observed in the image. A similar hypothesis is used when defining the subtasks and it is aimed to regroup images with similar dominant colours in the same task.

For each image, the CCT is computed using:

$$CCT = A_0 + A_1 \exp\left(-\frac{n}{t1}\right) + A_2 \exp\left(-\frac{n}{t2}\right) + A_3 \exp\left(-\frac{n}{t3}\right) \quad (4)$$

where $n=(x-x_e)(y-y_e)$, and $A_i$, $t_i$, $x_e$, $y_e$ are constants. Variables x, y are coordinates in the chromaticity space which can easily be estimated from the image's RGB values.

A histogram $H_s$ is then computed containing M bins of CCT values for camera s and each task is defined as the set of images in each histogram bin.

As a result, a task $T(D_s, m) \in \tau$ is defined as:

$$T(D_s,m) = \{I | a_s^m \leq CCT(I) \leq b_s^m, |Cam(I)=C_s\} \quad (5)$$

where Cam(I) is the camera used to acquire image I, and $a_s^m$, $b_s^m$ are the edges of bin m in histogram $H_s$. Intuitively, images within the same temperature bin will have a similar dominant colour, and therefore one could expect them to have similar illuminant corrections. In particular, when setting M=2, it is expected that images under a warm light source will be separated from images under a cold light source (e.g. indoor images vs. outdoor images). Therefore, the colour temperatures of the images are allocated to different bins, and therefore different tasks, if their colour temperatures are substantially different. Image colour temperatures are a scalar property and therefore all image temperatures lie somewhere on the (1D) real number line. Split points may be defined for the desired number of bins and the images are assigned to their respective bins if their colour temperature falls within the ranges defined by the split points. Bin split point values can be chosen in a number of different ways. They might be chosen as the mean or median of all image temperatures computed or alternatively at nonlinear (e.g. logarithmic) points along the real number line, to respect the natural distribution of the image temperature.

Figure 1:
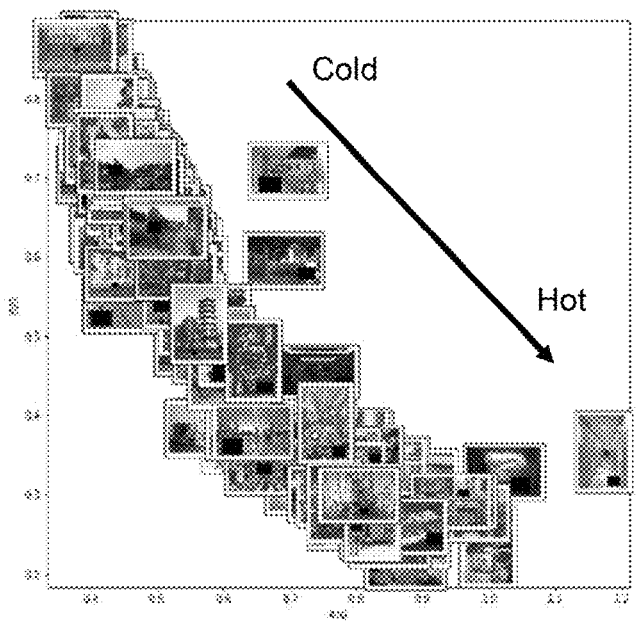
FIG. 1(a) shows pre-white balance images plotted on their respective [r, g, b] gain vector (GT) datapoint in $$\left[\frac{r}{g}, \frac{b}{g}\right]$$
Figure 1:
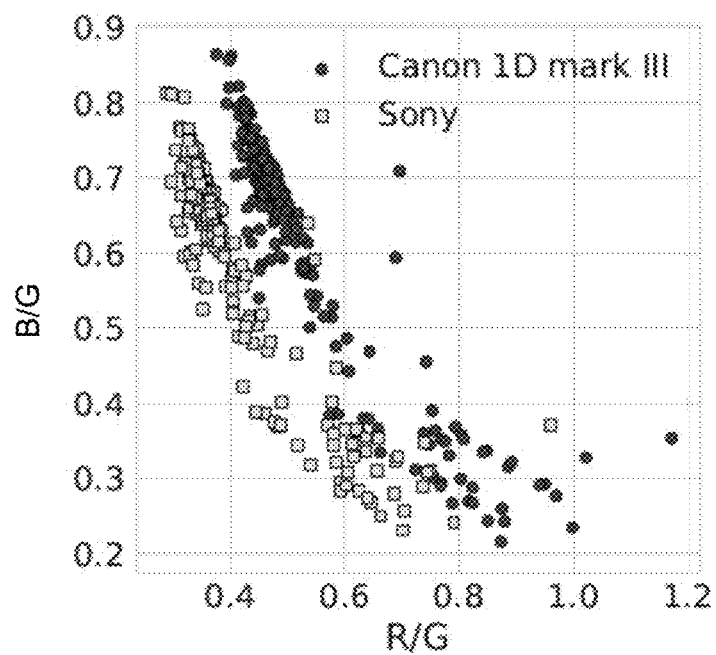

The AWB task distribution can therefore, in this example, be defined as images captured from a cross product of available cameras and histograms of image temperature bins. The validity of the meta-task definition using these properties is illustrated in FIG. 1. FIG. 1(a) shows pre-white balance images plotted on their respective [r, g, b] gain vector (GT) datapoint in $$\left[\frac{r}{g}, \frac{b}{g}\right]$$

space, showing correlation between perceptually meaningful image temperatures (hot, cold) and separable ground-truth gain clusters in RGB space. FIG. 1(b) shows GT datapoints, pertaining to identical scenes captured with two cameras, showing a distribution shift. Therefore, using colour temperature and the camera used to take the image as image properties to determine the task distribution is a valid design choice.

The strategy defining the task distribution is illustrated in FIG. 2(a). Considering a set of cameras, shown at 20, and camera-specific images, shown at 21, images are separated into subtasks based on illuminant colour. This is done by computing colour temperature for each image, shown at 22, and building a CCT histogram for each camera, shown at 23. Images in the same task are defined as images captured using the same camera and belonging to the same CCT histogram bin.

The meta-learning framework can then be used to train the model on multiple tasks. One example of a meta-learning framework is Model-Agnostic Meta-Learning (MAML). In this disclosure, the goal of meta-learning is to train a model on a variety of learning tasks, such that it can solve new learning tasks using only a small number of training samples. MAML is simple, yet can currently produce state of the art results in few-shot regression/classification and reinforcement learning problems. MAML learns good initialization parameters for a network, such that after a few steps of standard training on a few-shot dataset, the network will perform well on that few-shot task.

The method aims to find optimal initialisation parameters that allow good performance to be reached in only a few gradient updates, using only a small number of training samples for new unseen tasks. The process for the K-shot meta-learning is illustrated in FIG. 2(b).

Considering the set of tasks $\tau$ as defined in Equation (5), each MAML iteration samples a batch of tasks $\tau_i$. As shown at 24 in FIG. 2(b) (the 'inner update'), for each task, K meta-training images are randomly sampled and used to train model $f_\theta$ with original parameters $\theta$ for n standard gradient descent updates. The model's parameters $\theta$ are updated to be task-specific parameters $\theta_i$:

$$\theta_i = \theta - \alpha \nabla_\theta L_{\tau_i}(f_\theta) \quad (6)$$

where $\alpha$ is the learning rate parameter and $L_{\tau_i}(f_\theta)$ is the regression loss function as described in Equation (3). Finally, a new set of meta-test images are sampled from the same task $\tau_i$. For each task in the batch, the metatest loss function $L_{\tau_i}(f_{\theta_i})$ is computed using the task-specific updated parameters.

As shown at 25 in FIG. 2(b) (the 'outer update'), the global parameters are then updated as:

$$\theta' = \theta - \beta \nabla_\theta \Sigma_i L_{\tau_i}(f_{\theta_i}) \quad (7)$$

where $\beta$ is the meta-learning rate parameter.

At test time, parameters are optimised for a new unseen task using Equation (6) after n gradient updates and K training samples.

The illuminant correction for each test image I can then be computed as:

$$\rho_{\theta_i} = f_{\theta_i}(I)$$

FIG. 3 shows an example of an algorithm used to perform meta-learning for AWB estimation.

FIG. 4 summarises a method of generating a model for estimating scene illumination colour for a source image captured by a camera according to the present disclosure. In step 401, the method comprises acquiring a set of images, each image having been captured by a respective camera, the set of images as a whole comprising images captured by multiple cameras. In step 402, a set of tasks are formed by assigning each image of the set of images to a respective task such that images in the same task have in common that a property of those images lies in a predetermined range. The next step at 403 comprises training parameters of the analysis model by repeatedly: selecting at least one of the tasks, forming an interim set of model parameters in dependence on a first subset of the images of that task, estimating the quality of the interim set of model parameters against a second subset of the images of that task and updating the parameters of the model in dependence on the interim set of parameters and the estimated quality.

The model can then be used to determine the illuminant colour for an image collected by a camera not in the set of cameras by means of the model. Once determined, the illuminant correction can then be applied to a source image to transform it to a target image. The target image represents the scene of the source image under a canonical illuminant.

FIG. 5 shows an example of an architecture including a camera that uses the model to perform AWB. A camera 1 is connected to a communications network. Camera 1 comprises an image sensor 2. The camera also comprises a memory 3, a processor 4 and a transceiver 5. The memory stores in non-transient form code that can be run by the processor 4. In some implementations, that code may include a meta-learning algorithm as described above. The algorithm may include code that is directly executable by the processor and/or parameters such as neural network weightings which are not directly executable instructions but serve to configure other executable code that is stored in the memory 3. The transceiver 5 may be capable of transmitting and receiving data over either or both of wired and wireless communication channels. For example, it may support Ethernet, IEEE 802.11B and/or a cellular protocol such as 4G or 5G.

Such a camera 1 typically includes some onboard processing capability. This could be provided by the processor 4. The processor 4 could also be used for the essential functions of the device.

The transceiver 5 is capable of communicating over a network with other entities 10, 11. Those entities may be physically remote from the camera 1. The network may be a publicly accessible network such as the internet. The entities 10, 11 may be based in the cloud. Entity 10 is a computing entity. Entity 11 is a command and control entity. These entities are logical entities. In practice they may each be provided by one or more physical devices such as servers and datastores, and the functions of two or more of the entities may be provided by a single physical device. Each physical device implementing an entity comprises a processor and a memory. The devices may also comprise a transceiver for transmitting and receiving data to and from the transceiver 5 of camera 1. The memory stores in a non-transient way code that is executable by the processor to implement the respective entity in the manner described herein.

The command and control entity 11 may train the model used for estimating the illumination colour of the source image. This is typically a computationally intensive task, even though the resulting model may be efficiently described, so it may be efficient for the development of the algorithm to be performed in the cloud, where it can be anticipated that significant energy and computing resource is available. It can be anticipated that this is more efficient than forming such a model at a typical camera.

In one implementation, once the algorithm has been developed in the cloud, the command and control entity can automatically form a corresponding model and cause it to be transmitted to the relevant camera device. In this example, AWB is performed at the camera 1 by processor 4.

In another possible implementation, an image may be captured by the camera sensor 2 and the image data may be sent by the transceiver 5 to the cloud for processing, including AWB in the Image Signal Processor Pipeline. The resulting target image could then be sent back to the camera 1, as shown at 12 in FIG. 5.

Therefore, the method be deployed in multiple ways, for example in the cloud, on the device, or alternatively in dedicated hardware. As indicated above, the cloud facility could perform training to develop new algorithms or refine existing ones. Depending on the compute capability near to the data corpus, the training could either be undertaken close to the source data, or could be undertaken in the cloud, e.g. using an inference engine. The AWB correction may also be performed at the camera, in a dedicated piece of hardware, or in the cloud.

FIG. 6 shows angular-error results showing the benefit of performing the Auto White Balancing task using the described Meta-learning approach compared to the existing approach used on the P20 Pro smartphone.

The present disclosure solves the problem of inferring scene illuminants accurately for image sensors without access to large training data. It allows for the generation of models capable of fast task-adaption, allowing illuminant inference for new camera sensors using very few training images, typically 1+ orders of magnitude fewer than typical imagery for this task.

As a result, the AWB algorithm produces both measurably and perceptually high quality image illuminant estimation and is capable of generalizing to new image sensors with only few data samples.

Traditional AWB techniques are often specialised and adaptation to new scenarios and devices is not straightforward. A meta-learning approach simplifies this optimisation and has the advantage of not relying on large training datasets. In contrast to previously proposed methods, the technique described herein requires only few labelled samples and intrinsically learns an ability to generalize to new, previously unseen cameras.

The present disclosure addresses the sensor generalisation problem by introducing a few-shot meta-learning technique that is applied to many related, yet distinct, illuminant estimation tasks comprising of images from multiple camera sources exhibiting varying spectral sensitivity and diverse scene content. Using only handfuls of target-device labelled data, the model learns to adapt quickly to new sensors and infer accurate scene illuminants for images observed by previously unseen cameras.

An advantage of this solution over previous learning-based approaches for the AWB problem center around the fact that it can adapt quickly to provide strong performance on novel sensors using only few labelled image examples. The method exhibits strong performance using only handfuls of target-device labelled data. In this way, the method allows models to learn to quickly adapt and generalize to new sensors and infer accurate scene illuminants for images observed by previously unseen cameras.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the invention.

What is claimed is:

1. A processing entity, the processing entity configured to:
   generate a model for estimating scene illumination colour for a source image captured by a camera, the model generation comprising:
      acquiring a set of images, each image of the set of images having been captured by a respective camera, the set of images as a whole comprising images captured by multiple cameras;
      forming a set of tasks by assigning each image of the set of images to a respective task such that images in a same task have in common that a property of the images lies in a predetermined range, wherein the predetermined range corresponds to a set of colour temperatures of the respective image or the respective camera that captured the respective image, and wherein images captured by each camera are allocated to different tasks if colour temperatures of the images are substantially different; and
      training parameters of the model by repeatedly:
         selecting at least one of the tasks,
         forming an interim set of model parameters in dependence on a first subset of the images of that task,
         estimating a quality of the interim set of model parameters against a second subset of the images of that task, and
         updating the parameters of the model in dependence on the interim set of parameters and the estimated quality.

2. The processing entity as claimed in claim 1, wherein for each of the tasks, the images of the respective task have in common that they were captured by a single camera.

3. The processing entity as claimed in claim 2, wherein the colour temperature is a correlated colour temperature.

4. The processing entity as claimed in claim 1, wherein the set of tasks are formed such that different tasks correspond to different camera types.

5. The processing entity as claimed in claim 1, wherein the training parameters operation is performed using few-shot learning.

6. The processing entity as claimed in claim 5, wherein the step of training is performed by a meta-learning algorithm.

7. The processing entity as claimed in claim 1, wherein the cameras exhibit substantially varying spectral sensitivity or the images exhibit substantially diverse scene content.

8. The processing entity as claimed in claim 1, wherein the images comprise data indicating the respective camera that they were taken with.

9. The processing entity as claimed in claim 1, wherein the processing entity is further configured to train a model for estimating scene illumination colour for a source image captured by a further camera by:
   acquiring a further set of images, each image of the further set having been captured by the further camera;
   forming a further set of tasks by assigning each image of the further set of images to a respective task such that images in a same task have in common that a property of those images lies in a further predetermined range; and training parameters of the model for the further camera on the further set of tasks.

10. The processing entity as claimed in claim 9, wherein the further set of acquired images form a few-shot set.

11. A method of generating a model for estimating scene illumination colour for a source image captured by a camera, the method comprising:
  acquiring a set of images, each image of the set of images having been captured by a respective camera, the set of images as a whole comprising images captured by multiple cameras;
  forming a set of tasks by assigning each image of the set of images to a respective task such that images in a same task have in common that a property of the images lies in a predetermined range, wherein the predetermined range corresponds to a set of colour temperatures of the respective image or the respective camera that captured the respective image, and wherein images captured by each camera are allocated to different tasks if colour temperatures of the images are substantially different; and
  training parameters of the model by repeatedly:
    selecting at least one of the tasks,
    forming an interim set of model parameters in dependence on a first subset of the images of that task,
    estimating a quality of the interim set of model parameters against a second subset of the images of that task, and
    updating the parameters of the model in dependence on the interim set of parameters and the estimated quality.

12. The method as claimed in claim 11, the method further comprising determining illuminant colour for the source image collected by the camera, which is not comprised by the multiple cameras, using the generated model.

13. The method as claimed in claim 12, the method further comprising transforming the source image in dependence on the determined illuminant colour.

14. The method as claimed in claim 13, wherein the transformed image represents the scene of the source image under a canonical illuminant.

15. A camera comprising a processor configured to determine illuminant colour for the source image collected by the camera using the model generated by the method of claim 11.

* * * * *